March 1, 1960          A. A. LUNDSTROM          2,927,317
RADAR SYSTEMS EMPLOYING RANDOM PULSING
Original Filed March 26, 1948          2 Sheets-Sheet 1
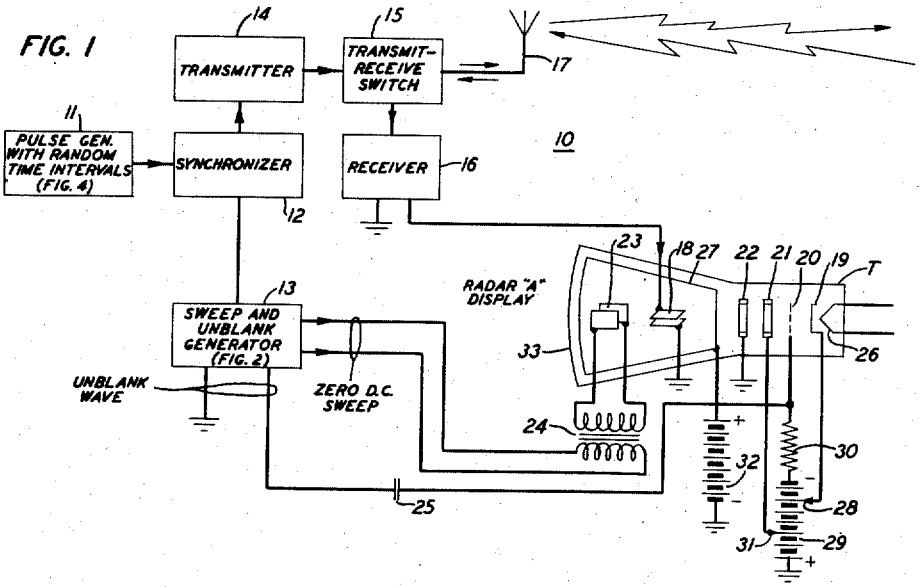
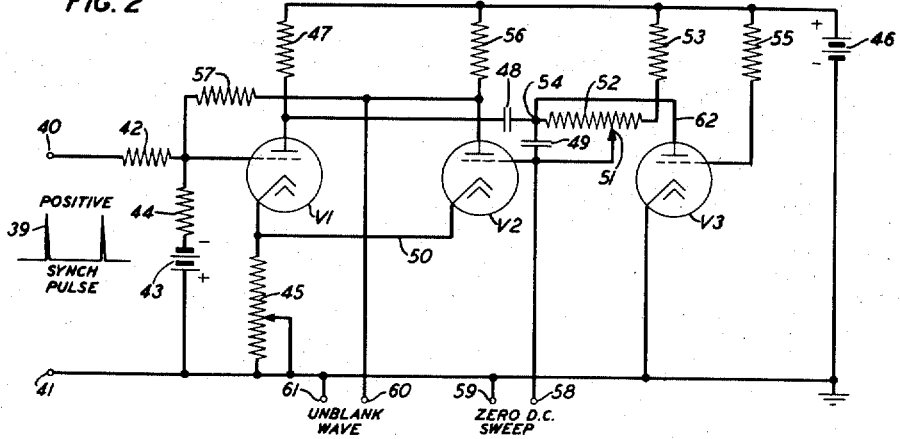
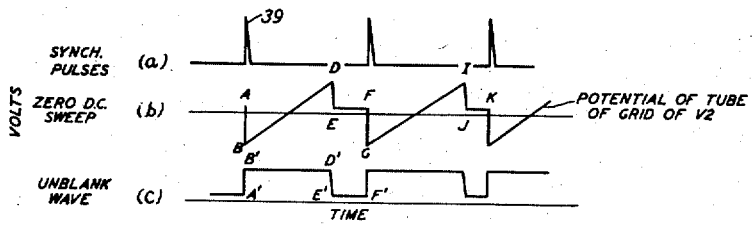
INVENTOR
A. A. LUNDSTROM
BY
         ATTORNEY March 1, 1960  A. A. LUNDSTROM  2,927,317
RADAR SYSTEMS EMPLOYING RANDOM PULSING
Original Filed March 26, 1948  2 Sheets-Sheet 2
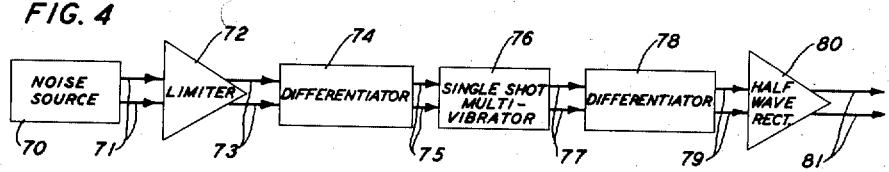
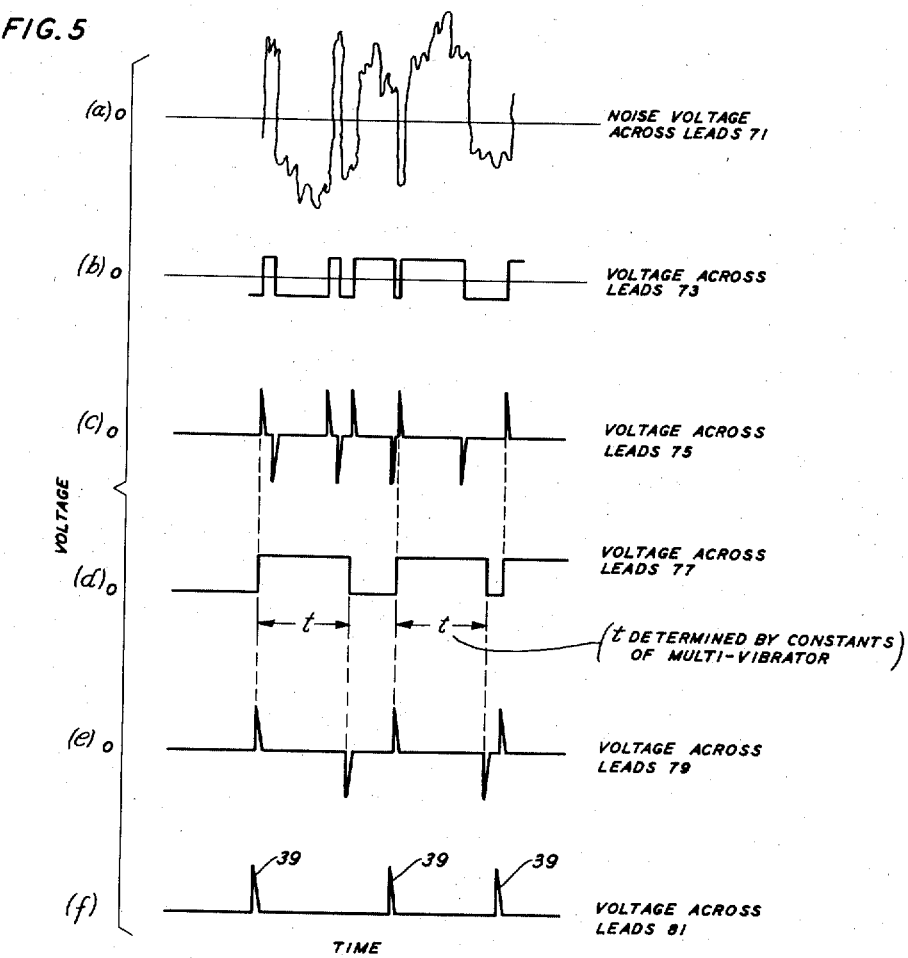
INVENTOR
A. A. LUNDSTROM
BY
ATTORNEY

United States Patent Office 2,927,317
Patented Mar. 1, 1960

2,927,317

RADAR SYSTEMS EMPLOYING RANDOM PULSING

Alexis A. Lundstrom, East Orange, N.J., assignor to Bell Telephone Laboratories, Incorporated, New York, N.Y., a corporation of New York Original application March 26, 1948, Serial No. 17,173. Divided and this application June 30, 1949, Serial No. 102,309

3 Claims. (Cl. 343—13)

This invention relates to radar systems and more specifically to systems of this type using a cathode ray tube or tubes to give indications of distance to or direction of a target. This application is a division of application Serial No. 17,173, filed March 26, 1948, now Patent No. 2,886,701.

In experiments on "anti-jamming" of fire control radars, it has been observed that it is a simple matter for the enemy to pick up the transmitted radar pulses and send back a burst of noise corresponding to an interval about the time of arrival of the reflected pulse from the target to thus mask the reflected pulse and make an accurate location of the target impossible. Only very simple equipment is needle to employ this method of jamming (called "leopard" jamming) when the pulse rate of the radar is fixed as it is thus possible to allow the jamming equipment of the enemy to be adjusted into synchronism with it. One modern radar employs as an anti-jamming pressure a pulsing system in which the various pulses are spaced by intervals which vary in a random manner. With this arrangement, it is difficult to time the burst of jamming noise to at all times include the reflected radar signal. It is thus much more difficult to jam in this manner a radar equipped with random interval pulsing.

In radar systems employing random pulsing, the question of generation and transmission of sweep signals through transformer and condenser coupled circuits is important. It can be shown that the response of these circuits to conventional sweeps of fixed duration but changing spacing have unwanted amplitude variations to cause a distorted radar presentation. A "conventional" sweep can be defined as one which at the time of the synchronizing pulse departs from a potential which is not changing with time to one which falls or rises in proportion to time for the sweeping interval. At the end of the sweep it returns almost instantly to the starting potential where it is maintained until the next synchronizing pulse appears. This wave has a direct current component which on a steady basis is subtracted out by transformer or condenser couplings. The magnitude of this direct current component varies with changes in spacing between sweeps and, therefore, these couplings remove this variable component to provide a response whose absolute magnitude depends on the pulsing rate. Where the sweep period varies in a random way between specified limits, the resulting changes in response, of course, depend on the time constant of the coupling and the character of the randomness. Also where the distribution of sweep periods is uniform between the stipulated limits, it can be shown that a time constant of practical value as defined by the low frequency cut-off of the condenser or transformer coupling adequately suppresses this effect. Since it is doubtful if the required degree of uniformity in distribution can be obtained and maintained and since the required low frequency cut-off of sweep transformers for the presentation in question is too small for practical transformer design, the "conventional" sweep is not desirable especially where transmission by transformer and cable through remote oscilloscope equipments is necessary.

It is an object of this invention to produce a radar employing random pulsing in which the above-mentioned disadvantages are not present.

It is another object of this invention to reduce the effects of certain types of jamming in radar systems.

In accordance with the invention, there is provided a radar system using a sweep circuit in which there is a portion of substantially constant potential and which has a zero direct current component. A zero direct current sweep can be defined as one which at the time of the synchronizing pulse rises or falls in substantially zero time from a potential that has, during the intersweep time, been of constant magnitude. The initial rise or fall closely equals one-half the total sweep swing so that at one-half the sweeping interval the amplitude passes through the potential of the intersweep interval and then to a value at sweep end equal to one-half the sweep swing. At this point, the wave returns in substantially zero time to the constant potential of the intersweep interval. It can thus be seen that the direct current component of this wave with reference to the potential of the intersweep interval is zero and the analysis of the response of a transformer or condenser coupling indicates therefore a greatly reduced variation in output magnitude with variable pulsing. This sweep generator also produces an unblank wave that is synchronized with the zero direct current sweep wave.

The invention will be more readily understood by referring to the following description taken in connectionw ith the accompanying drawings forming a part thereof in which:

Fig. 1 is a schematic single line block diagram of a radar system in accordance with the invention employing a zero direct current sweep circuit;

Fig. 2 is a circuit diagram of a sweep and unblank generator which forms part of the system of Fig. 1;

Fig. 3 is a graphical representation showing the wave shapes of the input and of the two output waves of the circuit of Fig. 2;

Fig. 4 is a single line schematic block diagram of a random pulse generator suitable for use in the circuit of Fig. 1; and Fig. 5 is a series of graphical representations to aid in understanding the operation of the random pulse generator of Fig. 4.

Referring more particularly to the drawings, Fig. 1 shows, by way of example for purposes of illustration, a simplified radar system 10 in accordance with the invention and employing a sweep and unblank generator which produces a sweep wave, the various deflecting portions of which are started at random time intervals, and an unblanking wave corresponding to said sweep wave. In the system of Fig. 1, a pulse generator 11, which may be of any suitable type for producing pulses with random time intervals between pulses (but a specific example of which will be described below in connection with Fig. 4), produces pulses having time separations therebetween which vary in random manner from a minimum to a maximum value. These pulses, which are shown by way of example in Fig. 5f, are fed into a synchronizer 12 which comprises time delay networks to compensate for inequalities in the time delays between the various components of the system so that the pulses fed into the sweep and unblank generator 13 start the sweep and unblanking waves at times corresponding in each case to the arrival of the reflected radar pulse if the target were at zero range. A synchronizing pulse, which may or may not be delayed with respect to the corresponding pulse from the random generator 11, is also delivered from the synchronizer 12 to transmitter 14 which is of any suitable type to cause a pulse of high frequency of corresponding duration to be applied to the transmit-receive switch 15 of any well-known type. The switch 15 is normally set so that the receiver 16 is connected to the antenna 17, of any well-known type, so that it is in a position to receive all reflected radar pulses between the transmitted pulses. When each high frequency pulse from the transmitter 14 is fed to the switch 15, the switch responds to transfer the connection of the antenna 17 from the receiver 16 to the transmitter 14 and the pulse proceeds through the switch 15 to the antenna where it is radiated into space. Immediately at the end of each short pulse from the transmitter 14 the switch 15 reverts to normal and transfers the antenna 17 from its connection with the transmitter 14 to its connection with receiver 16. In the meantime, the transmitted high frequency pulses are traversing the ether towards the target and are reflected thereby and return to the antenna 17 and proceed through the transmit-receive switch 15 to the receiver 16 where they are detected and amplified in known manner and applied to one pair of deflecting plates 18 in the cathode ray oscilloscope tube T.

The oscilloscope tube T is of any suitable type and comprises a cathode 19, cathode heater 26, a control element 20, focusing members 21 and 22, final anode member 27, the pair of deflecting plates 18 and a second pair of deflecting plates 23 which produce deflections at right angles to those produced by the voltage applied to the deflecting plates 18. A sweep wave from the generator 13 is applied to the deflecting plates 23 through any suitable coupling means such as, for example, the transformer 24, while an unblanking wave is applied through the coupling condenser 25 to the control element 20 which in the absence of the unblanking wave is biased beyond cut-off. The cathode 19 is heated by the heater 26 which receives current from any suitable source of current (not shown). The cathode is placed at any suitable potential, such as that of the tap 28 of the source 29 the positive terminal of which is connected to ground and the negative terminal of which is connected through registor 30 to the control element 20. The focusing member 21 is connected to a tap 31 on the source 29 which is more positive than that of the tap 28. The focusing member 22 is connected to ground (which is a more positive potential than that of the tap 31). The final anode 27 is placed at a positive potential with respect to ground by means of the source 32. The relative potentials applied to the various electrode members and their configuration and spacing are such that a focused beam of electrons is produced on the screen 33 of the tube T. The display on the screen 33 is an "A" display, that is, one in which the various targets are displayed against a time scale.

As pointed out above, the application of a "conventional" sweep wave to the deflecting plates 23 when random pulsing is used causes a variable direct current component to pass the transformer 24 and be applied to the deflecting plates 23 causing a distortion of the display on the screen. For an A-type display, successive echoes from the same target do not coincide on the screen of the tube and instead of each echo being a sharp "pip," it is spread out over a region of the range scale.

These disadvantages can be avoided by using a sweep generator which produces a sweep wave with a zero direct current component. Such a generator is shown in Fig. 2 which is a detail circuit drawing of such a circuit. In the circuit of Fig. 2, the randomly spaced positive synchronizing pulses from the synchronizer 12 are applied to terminals 40 and 41. The terminal 40 is connected through an isolating resistor 42 to the grid of the tube V1. For clarity in the description, it is convenient to describe as the "normal" condition of the circuit the condition which prevails just before the arrival of a synchronizing pulse 39. In this condition the vacuum tube V1 is biased to cut-off, by means of the source 43 and resistor 44, so that no current flows from its plate to its cathode. Between the cathode of tube V1 and ground is connected an adjustable resistor 45. The plate of the tube V1 is connected to the positive pole of the source 46 through anode resistor 47. The plate of the tube V1 is also connected through a sweep-charging condenser 48 and a wave-shaping condenser 49 to the grid of tube V2, while the cathode of the tube V1 is connected by means of lead 50 to the cathode of the tube V2. The grid of the tube V2 is connected to tap 51 of resistor 52 which forms a potentiometer with the resistor 53 between the positive terminal of the source 46 and the common terminal of the capacitors 48 and 49. This common terminal 54 is connected by lead 62 to the plate of the tube V3, the cathode of which is connected to ground and the control element of which is connected through the resistor 55 to the positive terminal of the source 46.

The plate of the tube V2 is connected through resistor 56 to the positive terminal of the source 46 and also through resistor 57 back to the grid of the tube V1, thus cross-coupling the tubes V1 and V2 in a manner somewhat similar to that existing in a multivibrator. When the tube V1 is cut off, the tube V2 is conducting, and vice versa. When the tube V2 is conducting the tube V3 is also conducting, and V3 is non-conducting when the tube V2 is shut off. The zero direct current sweep wave is taken from terminals 58 and 59, terminal 58 being connected to the grid of the tube V2 while terminal 59 is connected to ground. The unblanking wave is taken from terminals 60 and 61, the former being connected to the plate of the tube V2 and the latter being connected to ground.

The operation of the circuit shown in Fig. 2 will now be described. Just before the arrival of each synchronizing pulse or, in other words, when the circuit is "normal" as defined above, the vacuum tube V1 is biased to cut-off so that no current flows from its plate to cathode and it is held in this condition by the negative bias on its grid. The resistances 44, 45, 56 and 57, and the resistance of plate to cathode of the tube V2 are so proportioned to maintain the high negative grid bias on the tube V1. The tube V2 is normally conducting current from plate to cathode under control of the large positive grid bias applied from the positive terminal of the source 46 through resistance 53 and tap 51 of resistor 52. It is to be noted that grid current is flowing around the path from source 46, resistor 53, right portion of resistor 52, tap 51, grid of tube V2, cathode of tube V2, and variable resistor 45 to ground which is the negative terminal of the source 46. The tube V3 is normally conducting so that current flows through the circuit including source 46, resistance 53, resistance 52, lead 62 and the anode-cathode path of tube V3. This tube is held at all times with a positive grid bias and grid current flows from the positive terminal of source 46, through resistance 55, the grid of tube V3 to the cathode thereof and back through ground to the negative terminal of the source 46. This tube V3 will be referred to as the rest tube and its action will be described more fully below. If no electrical disturbance has been applied to terminals 40 and 41 for a period which exceeds the duration of a sweep, then the "normal" condition of the circuit prevails and, as described above, vacuum tube V1 is non-conducting while tubes V2 and V3 are conducting current between their plates and cathodes. Now assume a pulse 39 which, as shown in Fig. 3a and Fig. 5f, is randomly time-spaced from preceding and following pulses, is applied across the terminals 40 and 41. This positive pulse 39 overcomes the negative grid bias normally found on the tube V1 and drives the voltage existing between grid and cathode of this tube from highly negative to positive and causes grid current to flow. Since normally this tube is biased to cut-off so that no current flows from plate to cathode, the action of the positive synchronizing pulse is that of quickly driving the tube to a conducting condition so that current flows from plate to cathode of tube V1 through resistance 45, source 46 and resistance 47. This action has the effect of suddenly lowering the potential of the plate of the tube V1 with respect to ground by virtue of the sudden flow of current established through resistor 47 to cause a voltage drop across it. This sudden drop in voltage is applied by means of the condensers 48 and 49 to the grid of the tube V2. Due to the connection from source 46 through the resistors 52 and 53, the grid of the tube V2 is normally at a relatively low positive potential with respect to ground, this potential being much smaller than the positive terminal of the source 46. By virtue of this low potential on the grid of tube V2 and by virtue of the normally conducting tube V3 whose plate is connected from the junction point 54 of condensers 48 and 49, a small current passes through tube V3. Since normally only a small current flows through the portion of the resistor 52 to the left of the tap 51, it is seen that the junction 54 is of somewhat less potential than that of the grid of the tube V2 and thus is of relatively low potential above ground as compared to the potential of the source 46. As a result of the sudden application of potential reduction, as measured to ground, of the terminal of condenser 48 connected to the plate of the tube V1, this condenser suddenly starts to discharge to thus cause a current to flow from it to the plate of the tube V1, through it to its cathode, since it is now conducting, and thence through the relatively low resistance 45 to ground, the circuit being completed through the source 46, and resistances 53 and 52 to the condenser 48. If this transient current were allowed to completely dissipate itself it would completely discharge condenser 48 and then recharge to the opposite polarity with current from the source 46. That is, the transient current is made up of a simultaneous discharge current from the condenser 48 plus an opposite polarity charging current from source 46. Since normally condenser 48 has a voltage across it almost equal to that of the source 46 and the action of the vacuum tube circuit upon the application of the positive synchronizing pulse 39 to the terminals 40 and 41 is that reversing the condenser 48 with respect to source 46, the initial surge of current around the loop from the left terminal of condenser 48, plate-cathode path of tube V1, resistor 45, ground lead, source 46, resistor 53, resistor 52, and thence to the right-hand terminal of condenser 48 is approximately equal to twice the potential of the source 46 divided by the resistance of the circuit loop just described. This transient current substantially increases the potential drops across the resistors 53 and 52 so that the drop across resistor 53 and the portion of the resistor 52 to the right of the tap 51 is increased to a value in excess of the voltage of source 46 to cause the net potential of the grid of tube V2 to go negative with respect to its cathode and thus cause the plate-to-cathode current of this tube to go from a normal value to practically zero. Incidental to this reaction, it should be noted that the potential across the condenser 48 is normally approximately equal to that of the source 46 and with the left terminal at a highly positive potential above ground while the right terminal thereof is at a relatively small positive potential above ground. Right after the application of the positive synchronizing pulse 39 across terminals 40 and 41, the left terminal of condenser 48 assumes a relatively low potential with respect to ground by virtue of the large potential drop established across the resistor 47 and the relatively low resistance from plate to cathode of the tube V1 and resistor 45 as compared to the resistance of resistor 47. As a result, at this time the right terminal of the condenser 48 becomes highly negative with respect to ground and thus by lead 62 from this terminal to the plate of tube V3, this tube becomes non-conducting from plate to cathode. Thus, the application of each synchronizing pulse develops a negative potential on the grid of the tube V2 with respect to ground. Output terminal 58 for the zero direct current sweep is connected to the grid of the tube V2, the other terminal 59 being ground. The sudden change of grid potential of the tube V2 from a small positive value to a much larger negative value appears across terminals 58 and 59 as the beginning of the zero direct current sweep potential. This is indicated by the swing from small positive potential (point A in Fig. 3b) to the relatively large negative potential at point B in Fig. 3b. The transition from point A to point B is very fast but from then on condenser 48 is subject to a process of gradually reversing the potential of its charge. This causes an exponentially decaying current to be developed from the left terminal of condenser 48 through the plate-cathode path of the tube V1, resistor 45 and thence through source 46, resistor 53, and resistor 52 to the right terminal of condenser 48. Since the resistance of the resistors 52 and 53 is very high compared to the resistance through the conducting tube V1 from its plate to its cathode and thence through resistor 45, the time constant of the decaying current is approximately given by the product of the capacity of condenser 48 and the sum of the resistances of resistors 52 and 53. It is required that this time constant be very large compared to the time of one sweep length (from point B to point D in Fig. 3b). Therefore, the sweep time from point B to point D in Fig. 3b represents only the initial part of the exponential decaying current wave and is approximately linear. This linear change of potential with respect to time is desired in order that the radar oscilloscope presentation be uniform and linear. At the time corresponding to point B in Fig. 3b when tube V2 suddenly becomes non-conducting from plate to cathode, the plate potential of this tube experiences a sudden and large increase of potential with respect to ground because the plate-to-cathode current of tube V2, normally carried through resistor 56, has been suddenly reduced to zero to reduce the potential drop through that resistor. This increase of potential causes more current to flow through resistors 44 and 57 and thence through source 43 to ground. This causes a large increase in potential drop across the resistor 44 which is in a direction to overcome the negative bias normally applied to the tube V1, from the source 43 by way of the resistor 44. In this way, the arrival of the positive synchronizing pulse 39 across terminals 40 and 41 first drives the tube V1 to plate-to-cathode conduction and this in turn causes tube V2 to go to plate-to-cathode non-conduction under control of the discharge current from the condenser 48. As a result, the fact that tube V2 is no longer conducting from plate to cathode causes tube V1 to be held in the conducting condition. In addition, as already described, the reset tube V3 is made at this time non-conducting from plate to cathode. It is to be noted that the output sweep potential between terminals 58 and 59 is equal to the positive potential of source 46 minus the product of the transient current through the condenser 48 times the resistance of the resistor 53 and the portion of the resistor 52 to the right of the tap 51. At the beginning of the sweep (corresponding to point B on Fig. 3b) this transient potential drop exceeds the potential of the source 46. As the current decays, it passes through zero which corresponds to the time when the product of the transient current through condenser 48 times the resistance of the right-hand side of the resistance 52 and the resistance 53 just equals and cancels out the potential of source 46. The current keeps on decaying until the potential between terminals 58 and 59 reaches the maximum positive value indicated by the point D in Fig. 3b. At this point, tube V2 suddenly becomes conducting because the potential of its grid with respect to that of its cathode will have reached a value which allows plate-to-cathode current to flow through the tube. Since resistor 56 is considerably larger than resistor 47, then during the time of the sweep between points B and D in Fig. 3b there is an increase in potential drop that exists during this time across resistor 45 due to the higher current from source 46 through resistor 47 and through tube V1 which applies an increased negative grid bias on tube V2 since resistor 45 is common to the cathodes of both tubes V1 and V2. As a result of this, the tube V2 does not become conducting until the potential on terminals 58 and 59 becomes sufficiently positive to nullify the extra potential drop developed on the resistor 45. In this way, the sweep wave goes from a negative value to a considerable positive value in order to make tube V2 conducting again. At this time (corresponding to point D in Fig. 3b) the conduction of plate to cathode of tube V2 causes the plate of this tube to drop in potential with respect to ground due to the reestablishment of current through the resistor 56. This current causes a potential drop across this resistor which, when subtracted from the potential of the source 46, causes a reduction in current through the resistor 57 to the grid of tube V1 and the grid-to-cathode potential of the tube V1 suddenly becomes negative under control of the source 43. This jump in negative bias on tube V1 causes it to suddenly go from the conducting condition during the sweep interval between points B and D in Fig. 3b to the non-conducting condition, and this, so far as this tube is concerned, corresponds approximately to the "normal" condition before the positive synchronizing pulse 39 appeared between terminals 40 and 41. With the plate-to-cathode path of the tube V1 non-conducting and tube V2 conducting, then the potential on the left-hand terminal of condenser 48 suddenly starts to receive charging current from the source 46 through resistor 47 which resistor is no longer conducting current to tube V1. This positive surge of current passes through the condenser 48, causes the plate-to-cathode path of the reset tube V3 to conduct and carry the transient current to ground and to the negative terminal of source 46. The plate-to-cathode resistance of the positively biased tube V3 is small compared to the resistance of resistor 47, and it can be seen that the time constant of the circuit as far as the transient current through condenser 48 is concerned is approximately equal to the product of the capacity of condenser 48 and the resistance of the resistor 47. Resistor 47 should not only be small compared to the resistance of member 56 but also very small compared to that of the sum of the resistances of resistor 52 and resistor 53. With this requirement met, the time required to charge condenser 48 back to normal can be made small compared to the sweep interval. In this way, the time between sweeps can be made small compared to the length of the sweep and the next synchronizing pulse applied to terminals 40 and 41 can appear, if desired, within a relatively short time after the end of the sweep at point D. The by-passing of the transient current of the condenser 48 through the reset tube V3 to realize the fast recovery of the condenser to a "normal" charge also quickly removes this condenser from the grid circuit of the tube V2 so that it is quickly returned to "normal" condition (indicated by the point E in Fig. 3b). The potential across terminals 58 and 59 at points A and E of Fig. 3b corresponds to the grid-to-cathode voltage drop of the now conducting tube V2 and a small potential drop across resistor 45. For typical values, this potential may be approximately +3 volts while the sweep ranges from −17 volts at point B to +23 volts at point D to obtain a wave shape without a varying direct current component. (The small 3-volt bias is removed by the next coupling condenser or transformer, for example transformer 24 of Fig. 1, having a sweep wave with a zero direct current component.) The sweep time from point A to point D is fixed and does not vary from sweep to sweep (thus time from G to I equals that from A to D). However, the synchronizing pulses produced in the pulse generator 11 are generated in such a manner as to vary in spacing between a minimum value (in excess of the sweep time plus a small time interval necessary to recharge the condenser 48 to "normal") and any convenient maximum value. That is, the intersweep interval as represented by the distance between points E and F and between points J and K, etc. is randomly variable. This feature makes it difficult for the enemy to jam the radar by sending back false echoes generated in synchronism with the synchronizing pulses of the radar to indicate a false target position. By virtue of the zero direct current component in the sweep wave, the random separation between sweeps does not distort the sweep when it is transmitted through a non-direct current coupling transformer or condenser.

The simultaneous generation of an unblanking wave is accomplished by connecting terminal 60 to the plate of the tube V2 and connecting terminal 61 to ground. The unblanking wave appears across terminals 60 and 61 with the positive swing appearing on terminal 60. As already described, the arrival of the synchronizing pulse at terminals 40 and 41 causes tube V2 to become non-conducting and thus causes its plate potential with respect to ground to become high. Since terminal 60 is connected to this point, the low potential (point A' in Fig. 3c) corresponding to the normal condition of the circuit is suddenly increased to a high positive value (shown at point B') immediately after the arrival of the synchronizing pulse 39. Since tube V2 is maintained non-conducting until the end of the sweep interval, the potential across the terminals 60 and 61 is maintained at a constant value corresponding to that of point B' until the end of the sweep (corresponding to the point D'). As already described, at that time the tube V2 becomes suddenly conducting and thus the potential across terminals 60 and 61 drops to the lower value corresponding to the point marked E' in Fig. 3c. The value of the potential at the point A' as well as at the point F' just before the arrival of the next synchronizing pulse 39. Thus it is seen that the unblanking pulse is exactly synchronized with the sweep wave.

The adjustable resistor 45 and the adjustable tap 51 of the resistor 52 are used to adjust the sweep wave to zero direct current when the circuit is first put into use. This makes up for manufacturing variations in the circuit elements. The condenser 49 is of small capacity and is used primarily to aid in sharpening up the outlines of the zero direct current sweep. It should be noted that the periods EF, JK, etc. in Fig. 3b show a small direct current component but this can be neglected since the line EF is half-way between points D and G, the line JK is half-way between points I and L, and since it is always constant and, as pointed out above, removed by transformer 24 or coupling condenser replacing it, it can be neglected.

It has been noted experimentally that when a "conventional" sweep is applied to the deflection plates 23, through transformers of conventional design, there results an extreme of distortion and fluctuations in the order of inches of the display on the screen 33 when at the same time the synchronizing pulses are randomly spaced. However, a zero direct current sweep such as that produced by the circuit of Fig. 2 provides what appears to be a non-fluctuating display on the screen of the cathode ray tube.

While any suitable source can be used to produce the random pulses, a block diagram of one suitable source is shown in Fig. 4. Since all of the elements in Fig. 4 are well known in the art, they have been indicated by boxes. Referring now to Fig. 4, the noise source 70 comprises a gas or noisy vacuum tube circuit for generating a random noise wave across leads 71. This noise wave which, as shown in Fig. 5a, is randomly varying in both frequency and amplitude, is applied to limiter 72 which is an amplifier connected to chop off both positive and negative peaks. The potential variations across leads 73 are substantially those shown in Fig. 5c. These for the most part are a series of irregularly spaced square waves. These square waves are applied to the differentiator 74 where the steep sides of the square waves are converted to a series of randomly spaced short duration pulses of both positive and negative polarities in the lead 75. These pulses are then applied to a single-shot multivibrator 76 where they are converted into square pulses of fixed duration. The multivibrator 76 responds only to the positive pulses and forms a succeeding square wave across leads 77 only after the first wave has been completely formed. The series of square waves across leads 77 is then applied to the differentiator 78 where the vertical sides of these square waves are converted to a series of plus and minus pulses of fixed amplitude but of random spacing. These pulses across the leads 79 are applied to the half-wave rectifier 80 which passes only the positive pulses to the exclusion of the negative pulses. These positive pulses appear across the output leads 81 as a succession of pulses of equal amplitude but randomly spaced at an interval in excess of the minimum time determined by the fixed pulse time of the single-shot multivibrator 76. The pulses 39 across leads 81 are those applied to the synchronizer 12 in the system of Fig. 1.

Various changes can be made in the embodiment described above without departing from the spirit or scope of the invention.

What is claimed is:

1. A radar system comprising a source of pulses with randomly varying time intervals between pulses, a cathode ray device including two sets of deflecting means for producing deflections 90 degrees displaced from one another, means for transmitting waves modulated by pulses from said source to a distant target to produce echoes therefrom, means for receiving said echoes and for applying them to one of said sets of deflecting means, a sweep generator comprising means for producing repetitive sweep waves having substantially equal positive and negative peaks in which the time between consecutive sweeping portions varies randomly and in which the direct current component of the waves remains substantially zero, means for triggering said sweep generator in response to the pulses from said pulse source, and means for applying said sweep waves to said other set of deflecting means.

2. The combination of elements as in claim 1 in which said sweep generator also comprises means for producing a wave for blanking the cathode beam in said cathode ray device between consecutive sweeping portions.

3. The combination of elements as in claim 1 in which said sweep wave applying means includes a transformer.

References Cited in the file of this patent

UNITED STATES PATENTS

| | | |
|---|---|---|
| 2,059,219 | Farnsworth et al. | Nov. 3, 1936 |
| 2,110,245 | Stocker | Mar. 8, 1938 |
| 2,423,024 | Hershberger | June 24, 1947 |
| 2,425,600 | Coykendall | Aug. 12, 1947 |
| 2,426,216 | Hight | Aug. 26, 1947 |
| 2,605,462 | Reed et al. | July 29, 1952 |

FOREIGN PATENTS

| | | |
|---|---|---|
| 587,351 | Great Britain | Apr. 23, 1947 |